United States Patent
Hayasaka

(10) Patent No.: US 9,953,211 B2
(45) Date of Patent: Apr. 24, 2018

(54) IMAGE RECOGNITION APPARATUS, IMAGE RECOGNITION METHOD AND COMPUTER-READABLE MEDIUM

(71) Applicant: NEC Corporation, Tokyo (JP)

(72) Inventor: Akihiro Hayasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 14/882,765

(22) Filed: Oct. 14, 2015

(65) Prior Publication Data

US 2016/0110586 A1   Apr. 21, 2016

(30) Foreign Application Priority Data

Oct. 15, 2014   (JP) .................................. 2014-210530

(51) Int. Cl.
*G06K 9/00* (2006.01)
*G06K 9/62* (2006.01)

(52) U.S. Cl.
CPC ..... *G06K 9/00281* (2013.01); *G06K 9/00288* (2013.01); *G06K 2009/6213* (2013.01)

(58) Field of Classification Search
CPC ........... G06K 9/20; G06K 2009/00939; G06K 9/00221
USPC ................ 382/117, 118, 128, 209, 278, 282; 340/5.81, 583
See application file for complete search history.

(56) References Cited

U.S. PATENT DOCUMENTS

| 7,773,781 | B2* | 8/2010 | Kim | G06K 9/00261 382/118 |
| 7,783,083 | B2* | 8/2010 | Sung | G06K 9/00281 358/448 |
| 7,995,843 | B2* | 8/2011 | Iwasaki | G06K 9/00369 348/169 |
| 8,139,136 | B2* | 3/2012 | Iwamoto | H04N 5/23293 348/333.02 |
| 8,218,815 | B2* | 7/2012 | Kita | G06K 9/00214 382/103 |
| 8,233,720 | B2* | 7/2012 | Waragai | G06K 9/00228 382/103 |
| 8,320,642 | B2* | 11/2012 | Hyuga | G06K 9/00288 382/118 |
| 8,611,605 | B2* | 12/2013 | Kita | G06K 9/00214 348/222.1 |

FOREIGN PATENT DOCUMENTS

| JP | 2007-148872 | 6/2007 |
| JP | 2007-280250 | 10/2007 |
| JP | 2011-60038 | 3/2011 |
| JP | 4803214 | 10/2011 |
| JP | 2014-115784 | 6/2014 |

* cited by examiner

*Primary Examiner* — Yosef Kassa
(74) *Attorney, Agent, or Firm* — Finnegan, Henderson, Farabow, Garrett & Dunner, L.L.P.

(57) ABSTRACT

An image recognition apparatus, method and non-transitory computer-readable storage medium are disclosed. An image recognition apparatus may include a memory storing instructions, and at least one processor configured to process the instructions to, determine an occlusion pattern of a face in a facial image representing the face by comparing the facial image with a standard facial image representing a standard face, and identify the facial image using a region determined by the occlusion pattern in the facial image.

16 Claims, 11 Drawing Sheets

IMAGE RECOGNITION APPARATUS, IMAGE RECOGNITION METHOD AND COMPUTER-READABLE MEDIUM

CROSS-REFERENCE TO RELATED APPLICATIONS

This application claims priority from Japanese Patent Application No. 2014-210530, filed on Oct. 15, 2014, in the Japanese Patent Office (JPO), the disclosure of which is incorporated herein by reference in its entirety.

TECHNICAL FIELD

The present disclosure may generally relate to a technique to identify a facial image including an occluded region.

BACKGROUND

Existing image recognition apparatuses may identify facial images. However, existing image recognition apparatus may suffer from reduced recognition accuracy when the face of the analyzed image is partially occluded with a wearing article such as glasses, sunglasses and a mask.

One of the related techniques may calculate an inter-pattern distance between each of small regions in an input image and a small region in a registered image at the position corresponding to the small region in the input image. The related technique may identify the input image on a basis of an integrated distance calculated using a predetermined number of the inter-pattern distance in ascending order. In the related technique, small regions of the input image and the registered image having a large inter-pattern distance may not contribute to the identification. Therefore, this related technique may enable matching between the input and registered images while excluding the small regions significantly different between the input image and the registered image due to occlusion.

Another related technique may register beforehand multiple pieces of facial information for each user in different states of wearing a wearing article (glasses or the like). This related technique may find candidate facial information similar to an input facial image among the multiple pieces of facial information. The related technique may find a different kind of facial information in a different wearing state from the candidate facial information among the multiple pieces of facial information registered for the user corresponding to the candidate facial information. When the input facial image and the different kind of facial information are similar in regions other than the region where the wearing article is worn, the related technique may determine that the input facial image represents the user corresponding to the candidate facial information. Thus, the related technique can perform matching irrespective of whether the wearing article is worn or not in the input facial image.

There may be another related technique. When determining that there is a wearing article in the facial image, the related technique may extract a first feature value from a region in the facial image excluding a wearing article region. The related technique may register the facial image with the wearing article, together with the first feature value. When determining that there is no wearing article in a facial image, the related technique may extract the first feature value and a second feature value from a region in the facial image including a possible wearing article region. The related technique may register a facial image without wearing an article, together with the first and second feature values. The related technique may extract the first feature value or the second feature value from the input facial image, and perform matching between the extracted feature value and the first feature value or the second feature value of the registered image. Thus, the related technique can perform matching in both cases where there is a wearing article in the registered facial image and no wearing article in the input facial image, and where there is no wearing article in the registered facial image and a wearing article in the input facial image.

Another related technique may divide an input facial image and a reference facial image into small regions. The vertexes of the small regions may be feature points of the input facial image and the reference facial image. The related technique may compare each pair of the corresponding small regions. The related technique may determine whether or not each of the small regions in the input facial image is an occluded region, on a basis of the comparison result.

Another related technique may use an associative memory circuit subjected to prior training to complement a partially occluded region in an input facial image. The related technique may perform matching using a complemented recall image. Thus, the related technique may perform matching using all images as images including no occluded regions.

SUMMARY OF THE DISCLOSURE

Examples of the present disclosure overcome the above disadvantages and other disadvantages not described above. Also, the present examples are not required to overcome the disadvantages described above, and an example of the present disclosure may not overcome any of the problems described above.

According to a first aspect of the present disclosure, an image recognition apparatus is disclosed. An image recognition apparatus may include a memory storing instructions, and at least one processor configured to process the instructions to, determine an occlusion pattern of a face in a facial image representing the face by comparing the facial image with a standard facial image representing a standard face, and identify the facial image using a region determined by the occlusion pattern in the facial image.

According to a second aspect of the present disclosure, an image recognition method is disclosed. The image recognition method may include determining an occlusion pattern of a face in a facial image representing the face by comparing the facial image with a standard facial image representing a standard face, and identifying the facial image using a region determined by the occlusion pattern in the facial image.

According to a third aspect of the present disclosure, a non-transitory computer-readable storage medium is disclosed. The non-transitory computer-readable storage medium may determining an occlusion pattern of a face in a facial image representing the face by comparing the facial image with a standard facial image representing a standard face, and identifying the facial image using a region determined by the occlusion pattern in the facial image.

BRIEF DESCRIPTION OF THE DRAWINGS

Aspects of examples will be more apparent by describing certain examples with reference to the accompanying drawings, in which.

DETAILED DESCRIPTION

The following description of illustrative, non-limiting embodiments discloses specific configurations, components, and processes. However, the embodiments are merely examples, and thus, the specific features described below are merely used to more easily describe such embodiments and to provide an overall understanding. Accordingly, one skilled in the art will readily recognize that the present disclosure is not limited to the specific embodiments described below. Furthermore, the descriptions of various configurations, components, and processes of the embodiments that would have been known to one skilled in the art are omitted for the sake of clarity and brevity.

First Example

Figure 1:
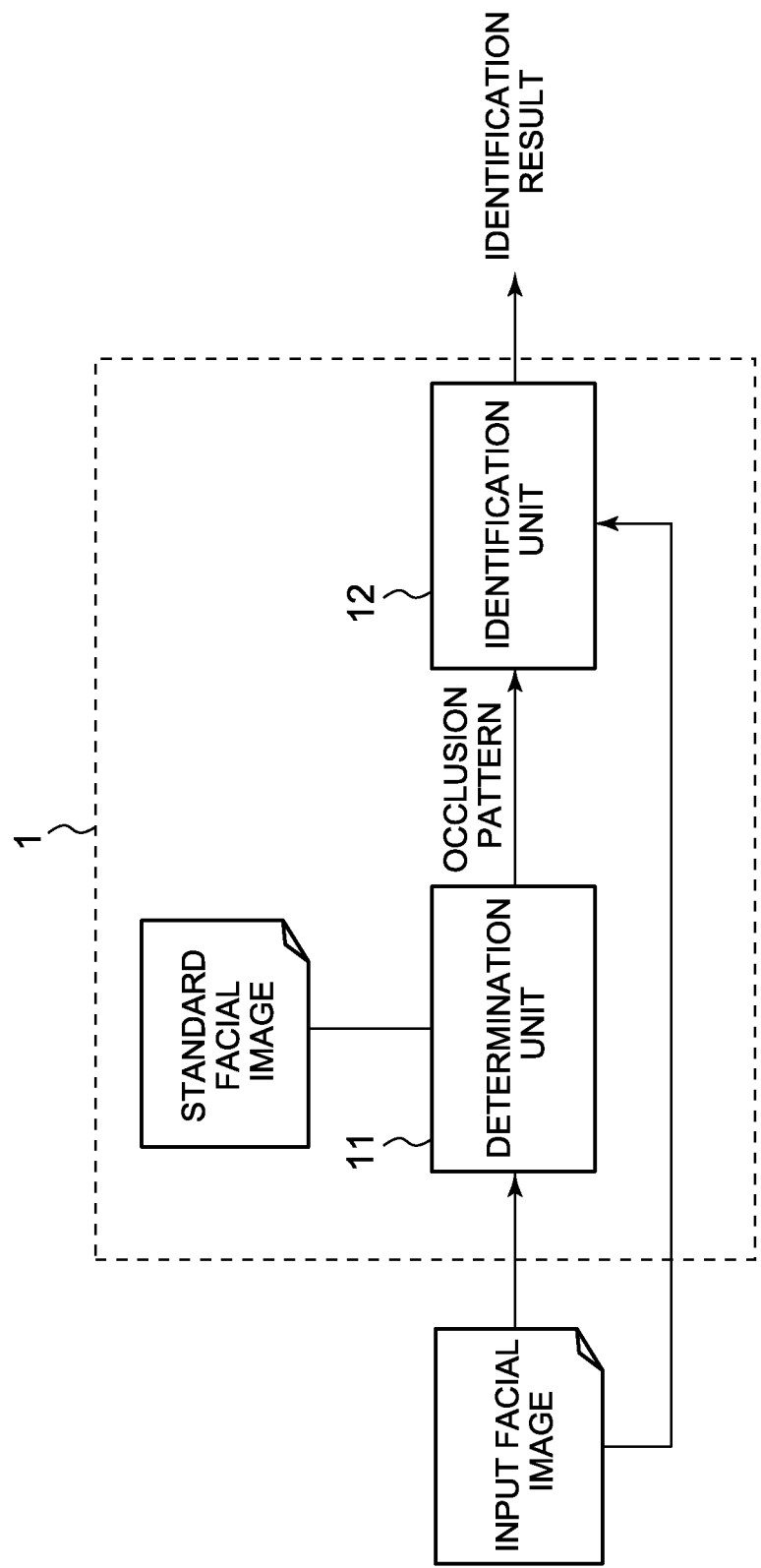
FIG. 1 is a block diagram of an image recognition apparatus according to embodiments of the present disclosure.

FIG. 1 shows a configuration of an image recognition apparatus 1 according to embodiments of the present disclosure. In FIG. 1, the image recognition apparatus 1 may include a determination unit 11 and an identification unit 12. Disclosed "units" may be, for example, application specific integrated circuits, separate or combined processors. Disclosed units may be hardware, software or a combination or hardware and software (e.g., a programmable ship).

Figure 2:
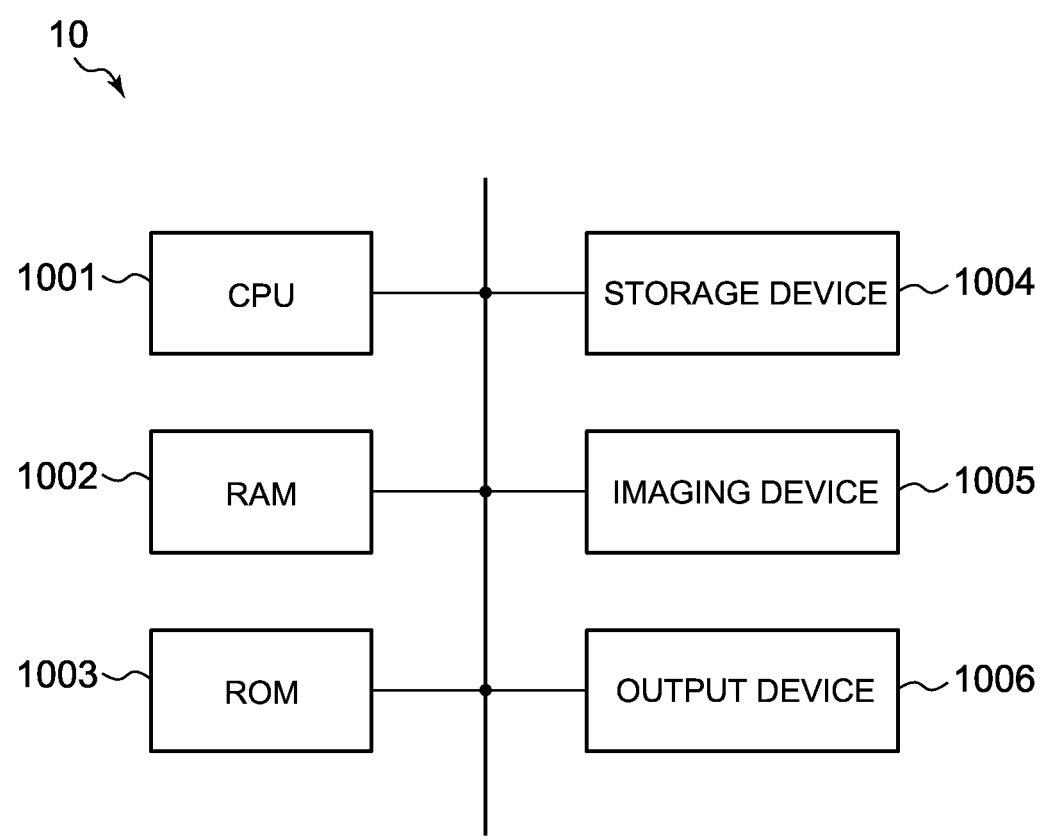
FIG. 2 is a diagram illustrating an example of a hardware configuration of the image recognition apparatus according to embodiments of the present disclosure.

As shown in FIG. 2, the image recognition apparatus 1 may be configured as a computer apparatus including a CPU (Central Processing Unit) 1001, a RAM (Random Access Memory) 1002, a ROM (Read Only Memory) 1003, a storage device 1004 such as a hard disk, an imaging device 1005, and an output device 1006. The ROM 1003 and the storage device 1004 may store computer programs and various data to cause the computer apparatus to function as the image recognition apparatus 1 according to embodiments of the present disclosure. The imaging device 1005 may be a device such as a camera and a video camera to generate an image representing a face by taking an image of a face of a person. The output device 1006 may be a device such as a display to output information. The CPU 1001 may control the respective units in the computer apparatus by reading the computer programs and various data stored in the ROM 1003 and the storage device 1004 into the RAM 1002 and executing the computer programs and data.

The determination unit 11 may include the imaging device 1005 and the CPU 1001 which reads the computer programs and various data stored in the ROM 1003 and the storage device 1004 into the RAM 1002 and execute the computer programs and data. The identification unit 12 may include the output device 1006 and the CPU 1001 which reads the computer programs and various data stored in the ROM 1003 and the storage device 1004 into the RAM 1002 and execute the computer programs and data. The image recognition apparatus 1 and the hardware configuration of the respective functional blocks thereof may not be limited to those described above.

An example of configurations of the functional blocks of the image recognition apparatus 1 will be described.

The determination unit 11 may determine an occlusion pattern of a face in a facial image by comparing the facial image with a standard facial image. The facial image may be an image representing a face. For example, the determination unit 11 may obtain a facial image through the imaging device 1005. The standard facial image may be an image representing a standard face. It is assumed that the standard facial image is predetermined and stored in the storage device 1004, for example. It is assumed that the facial image and the standard facial image are images each obtained by cutting a region representing a face out of the appropriate image. In this example, it is assumed that the facial image and the standard facial image are approximately the same in size, facial orientation and the like.

The occlusion pattern may be information indicating which region of the face is occluded with what kind of an occluding article. In some instances, the occlusion pattern may be information such as indications that the mouth is occluded with a mask or the eyes are occluded with sunglasses. For example, the determination unit 11 may estimate occluded regions, in which the face is occluded with an occluding article, by comparing the facial image with the standard facial image, and determine the occlusion pattern considering a distribution of the estimated occluded regions.

The identification unit 12 may identify the facial image while excluding the regions based on the occlusion pattern in the facial image. The excluded regions may be predetermined according to a possible occlusion pattern. The excluded regions may not have to coincide with the occluded regions estimated in the process of determining the occlusion pattern by the determination unit 21. As to the facial image identification technique, a well-known technique may be adopted. The identification unit 12 may output the identification result to the output device 1006.

Figure 3:
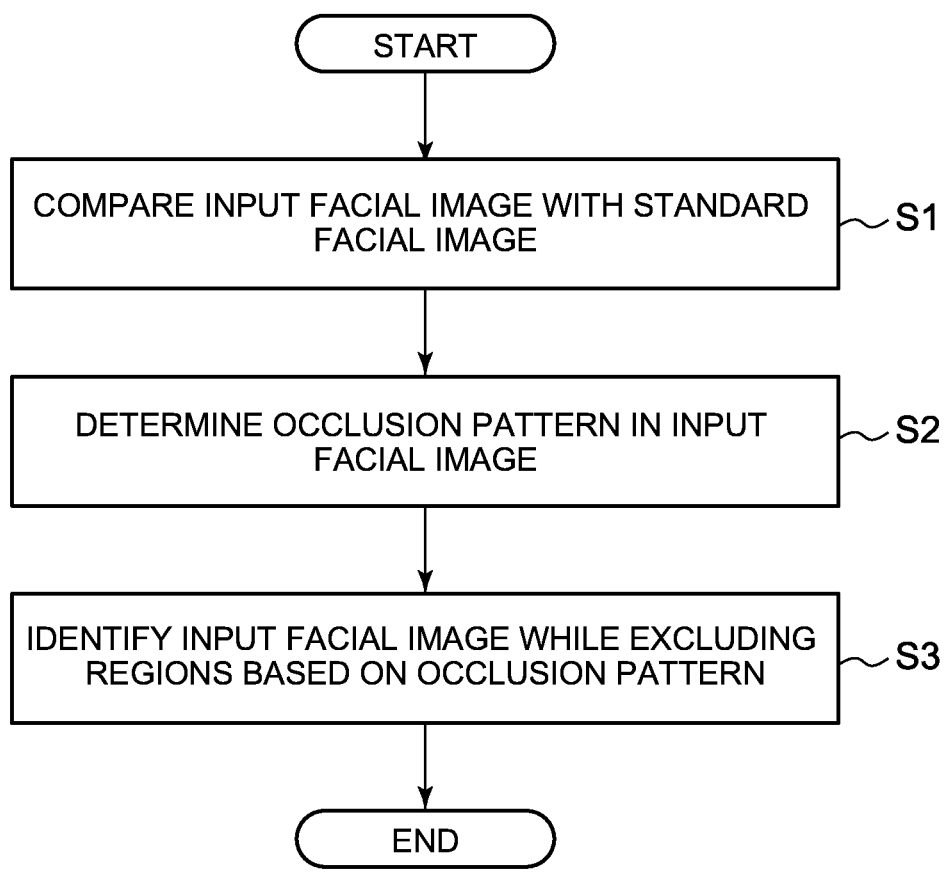
FIG. 3 is a flowchart depicting operations of the image recognition apparatus according to embodiments of the present disclosure.

With reference to FIG. 3, an example of operations of the above-described image recognition apparatus 1 will be described.

In the Step S1, the determination unit 11 may compare an input facial image with a standard facial image.

In the Step S2, the determination unit 11 may determine an occlusion pattern in the input facial image, on a basis of the comparison result in the Step S1.

In the Step S3, the identification unit 12 may identify the input facial image while excluding regions based on the occlusion pattern determined in the Step S2 from the input facial image. The identification unit 12 may output the identification result.

The image recognition apparatus 1 may finish its operations.

An example of effects of the first example will be described.

The image recognition apparatus according to the first example may improve the recognition accuracy of an image including an occluded region without increasing costs for constructing a system and identification processing load.

The reason for that may be because the determination unit determines the occlusion pattern in the facial image by comparing the facial image with the standard facial image, and the identification unit may identify the facial image while excluding the regions based on the occlusion pattern in the facial image.

As described above, the image recognition apparatus according to the first example may determine the occlusion pattern considering the distribution of the occluded regions in the facial image by comparing the facial image with the standard facial image. The image recognition apparatus according to the first example may not exclude the occluded regions themselves estimated to be occluded on the basis of the comparison with the standard facial image, but may exclude for identification the regions previously set for the occlusion pattern determined considering the distribution of the occluded regions. In some aspects, this example may realize robust occlusion detection against errors in determination of occluded regions. This example may prevent reduction in recognition accuracy due to errors in determination of occluded regions, and improve the facial image recognition accuracy.

In some aspects, this example may not require prior training of the function to determine the presence or absence of an occluding article for each kind of occluding article. This example may not require prior registration of images corresponding to the presence or absence of occlusion for each user. This example may not require extraction of feature value for the number of kinds of occluding articles. In this example, the standard facial image may be prepared beforehand, and the regions to be excluded may be set according to a possible occlusion pattern. Thus, this example may prevent increase in costs for constructing a system and identification processing load.

Second Example

A second example will be described in detail with reference to the drawings. In the drawings to be referred to in the description of this example, the same configuration as that of the first example as well as the steps to be performed in the same manner as the first example may be denoted by the same reference numerals.

Figure 4:
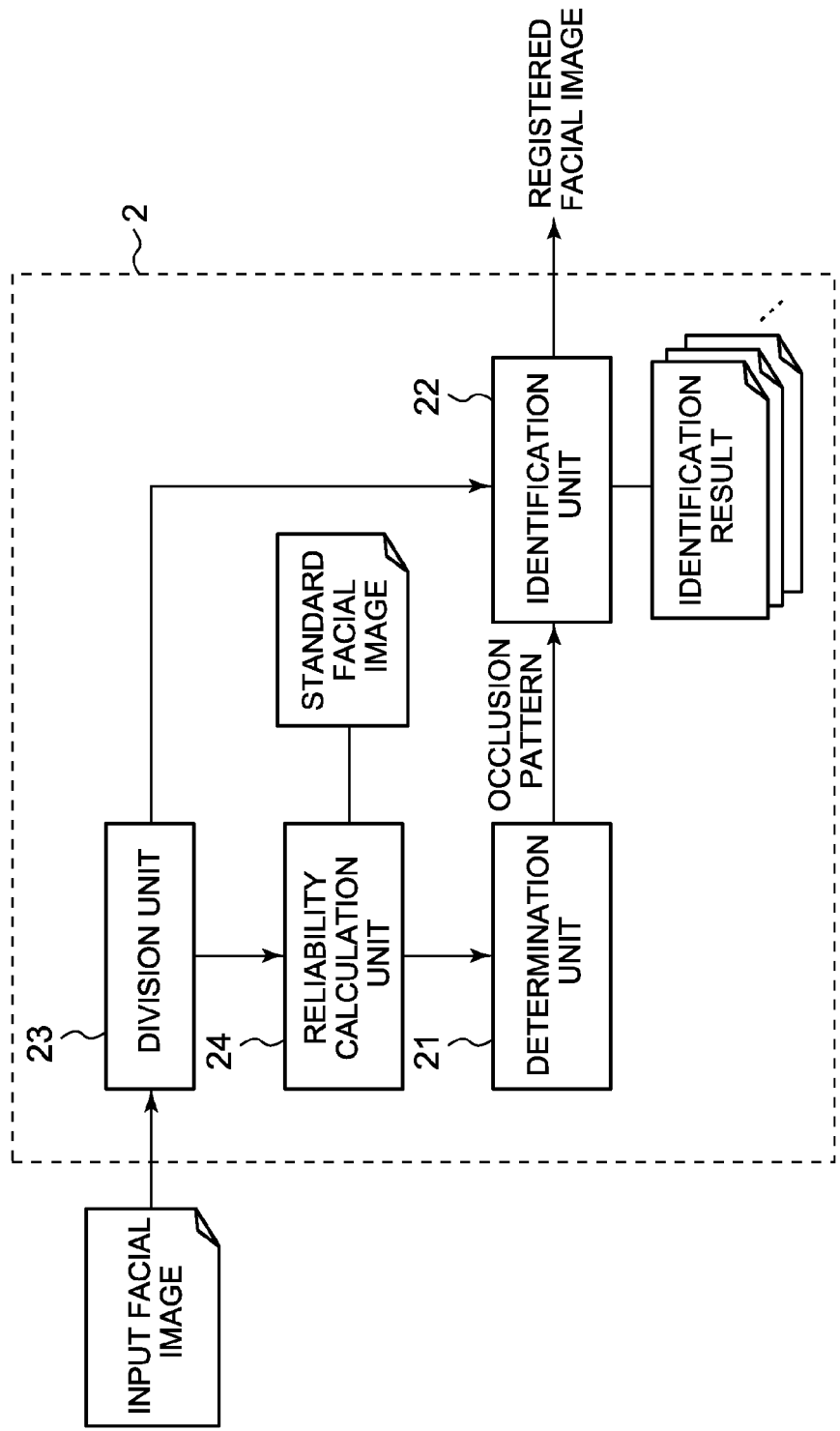
FIG. 4 is a block diagram of an image recognition apparatus according to embodiments of the present disclosure.

FIG. 4 shows a configuration of an image recognition apparatus 2 according to embodiments of the present disclosure. In FIG. 4, the image recognition apparatus 2 may include a determination unit 21 and an identification unit 22. The image recognition apparatus 2 may include a division unit 23 and a reliability calculation unit 24.

The image recognition apparatus 2 may include the same hardware components as those in the image recognition apparatus 1 as the first example described with reference to FIG. 2. In some aspects, the division unit 23 may include an imaging device 1005 and a CPU 1001 configured to read computer programs and various data stored in a ROM 1003 and a storage device 1004 into a RAM 1002 and execute the computer programs and data. In other aspects, the reliability calculation unit 24 may include the CPU 1001 configured to read the computer programs and various data stored in the ROM 1003 and the storage device 1004 into the RAM 1002 and execute the computer programs and data. The image recognition apparatus 2 and the hardware configuration of the respective functional blocks thereof may not be limited to those described above.

An example of configurations of the functional blocks of the image recognition apparatus 2 will be described.

The division unit 23 may divide a facial image into small regions (also referred to as patches). The division unit 23 may obtain a facial image through the imaging device 1005. For example, the division unit 23 may divide the facial image into small regions having the same shape. For example, the division unit 23 may divide the facial image such that the shape of a certain small region is different from that of at least some of the others. The divided small regions may partially overlap with each other. The division unit 23 may divide the facial image into small regions having the same arrangement and shape as those of the standard facial image. For example, the division unit 23 may divide the standard facial image beforehand into small regions, and divide an input facial image into the same small regions. For example, the division unit 23 may obtain information on the standard facial image divided beforehand into small regions, and divide the facial image into the same small regions as those obtained.

The division unit 23 may perform processing of normalizing a facial image before dividing the facial image. The normalizing processing may be in order to deal with the case where a facial image to be input to the image recognition apparatus 2 is not normalized. In some instances, the division unit 23 may generate a facial image obtained by normalizing the face in the facial image. It is assumed that the normalization means transformation processing of the face such that the angle, size and the like thereof are changed to predetermined angle and size. For example, the division unit 23 may detect feature points such as the eyes and mouth in the input facial image, and perform geometric transformation so that the feature points are located at predetermined positions. When an image input to the image recognition apparatus 2 is one including a range wider than the face, the division unit 23 may perform normalization after cutting a facial image out of the input image. For example, the division unit 23 may adopt the method in the related technique for the normalization processing of the facial image. The division unit 23 may use another method to normalize the input facial image.

Figure 5:
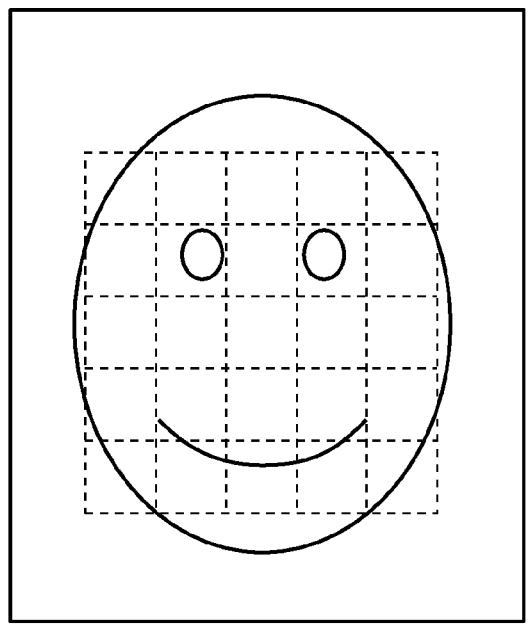
FIG. 5 is a diagram illustrating an example of small regions obtained by dividing a facial image according to embodiments of the present disclosure.
Figure 6:
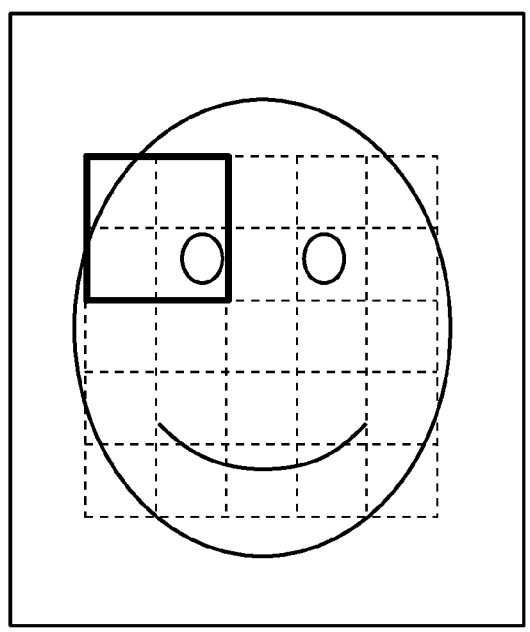
FIG. 6 is a diagram illustrating another example of small regions obtained by dividing the facial image according to embodiments of the present disclosure.
Figure 7:
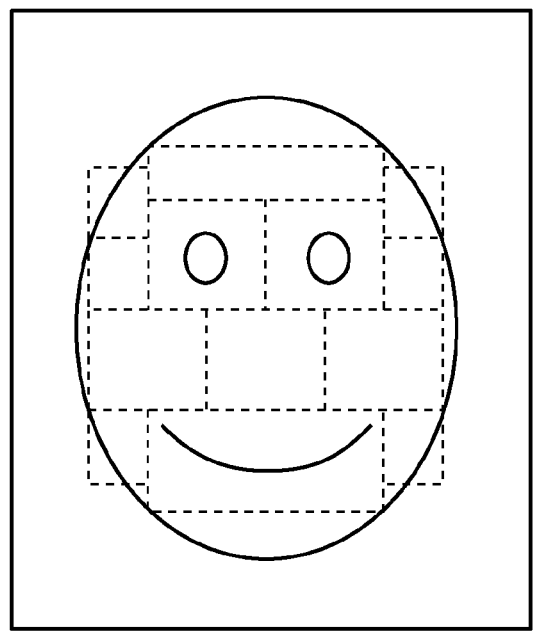
FIG. 7 is a diagram illustrating another example of small regions obtained by dividing the facial image according to embodiments of the present disclosure.
Figure 8:
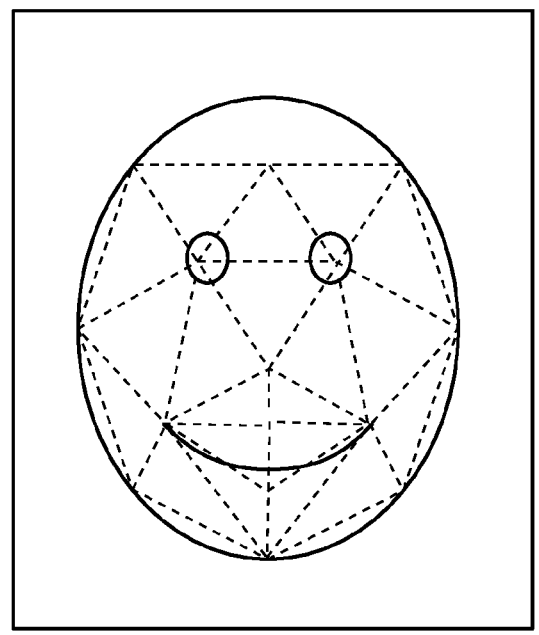
FIG. 8 is a diagram illustrating another example of small regions obtained by dividing the facial image according to embodiments of the present disclosure.

In some instances, the division unit 23 may divide the normalized facial image into rectangular small regions having the same size in a lattice pattern as shown in FIG. 5. In other instances, as shown in FIG. 6, the facial image may be divided such that some of or all of the small regions overlap with the others. In FIG. 6, a small region represented by a rectangle indicated by a heavy solid line overlaps with four small regions represented by rectangles indicated by broken lines. In other instances, the division unit 23 may divide the normalized facial image into small regions such that the size of a certain small region differs from that of at least some of the others, as shown in FIG. 7. In other instances, the division unit 23 may divide the normalized facial image into small regions having a shape (e.g., triangle) other than the rectangle, as shown in FIG. 8. The division unit 23 may divide the facial image into small regions having any shape or size that does not interfere with the processing by the reliability calculation unit 24 and the identification unit 22.

The reliability calculation unit 24 may compare corresponding small regions among the small regions included in the facial image and the small regions included in the standard facial image. The reliability calculation unit 24 may calculate the reliability on a basis of the comparison result for each of the small regions in the facial image. The reliability may represent the possibility of whether or not a certain small region is an occluded region in which the face is occluded with an occluding article. The reliability may be lower as the possibility of the small region being the occluded region is higher, and may be higher as the possibility is lower.

The standard facial image may be stored in the storage device 1004 in advance. It is assumed that the standard facial image is normalized beforehand. For example, the standard facial image may be one representing a face, such as a general identification photograph, including no occluded region. The standard facial image may be a facial image that tends to match with more facial images. For example, the standard facial image may be an image representing an average face obtained by averaging faces of a number of people. The standard facial image may be an image representing wolf/lamb (a sample whose similarity to faces of a number of people satisfies a predetermined condition). The standard facial image may be an image representing an object (artificial object) that is artificially produced to be similar to the faces of a number of people. Further, the standard facial image may be divided beforehand into small regions. In some aspects, the small regions included in the standard facial image may be divided by the division unit 23.

For example, the reliability calculation unit 24 may calculate the reliability by summing up differences in luminance between corresponding small regions. In some aspects, the reliability calculated using the luminance may be likely to be influenced by various illumination conditions. Therefore, the reliability calculation unit 24 may calculate the reliability using a feature vector for each small region. The feature vector may be information obtained by feature extraction processing, such as a Gabor filter and a LBP (Local Binary Pattern), used in face authentication, for example. In some aspects, the feature vector may be information obtained by feature extraction processing, such as a Haar-like filter, often used in face detection. In some aspects, the reliability calculation unit 24 may calculate the reliability on a basis of a distance or correlation between the feature vectors of corresponding small regions. On a basis of such a feature vector, the reliability calculation unit 24 may calculate the reliability having reduced influence of various illumination conditions and the like. When the reliability is calculated on a basis of the distance between the feature vectors, the reliability may represent that the larger the value, the higher the possibility of the small region being the occluded region. When the reliability is calculated on a basis of the correlation between the feature vectors, the reliability may represent that the smaller the value, the higher the possibility of the small region being the occluded region. For example, the reliability calculation unit 24 may calculate a normalized correlation value between the feature vectors, and use the calculated value as the reliability of each small region. In some instances, the closer to 1 the reliability may be, the higher the possibility of the small region being a non-occluded region. In other instances, the closer to 0, the higher the possibility of the small region being the occluded region. The following description may be the example where the reliability is the normalized correlation value.

The determination unit 21 may determine an occlusion pattern on a basis of a distribution of reliabilities of the respective small regions in the facial image. The determination unit 21 may determine, for a medium region formed of a group of small regions within a predetermined range, whether or not a distribution of reliabilities of the group of small regions included in the medium region satisfies an occlusion condition. When the distribution satisfies the occlusion condition, the determination unit 21 may estimate the medium region to be the occluded region. In some aspects, the determination unit 21 may determine an occlusion pattern on a basis of the distribution of the estimated occluded regions.

For example, the determination unit 21 may determine whether the reliability of each of the small regions included in the medium region is higher or lower than a threshold. The determination unit 21 may determine that the reliability of the small region having a determination result different from those of the surrounding small regions is noise. In some instances, when the reliability of the group of small regions included in the medium region satisfies the occlusion condition that the small regions each having reliability lower than the threshold constitute the majority of the group of small regions, the determination unit 21 may estimate the medium region to be the occluded region. The occlusion condition may be any other condition. The determination unit 21 may determine an occlusion pattern on a basis of the distribution of the medium regions estimated to be the occluded regions. The medium region may be set hierarchically. For example, the determination unit 21 may be configured to set a large region by further collecting the medium regions within a predetermined region, each medium region including a group of small regions within a predetermined range. When the distribution of the medium regions estimated to be the occluded regions among those included in the large region satisfies the occlusion condition, the determination unit 21 may estimate the large region to be the occluded region. In some aspects, the determination unit 21 may determine an occlusion pattern on a basis of the distribution of the large regions estimated to be the occluded regions. The number of hierarchies from the small region to the large region may not be limited to three, i.e., small, medium and large, but the regions may be designed in more hierarchies.

For example, the determination unit 21 may set an upper face region including a group of small regions above the nose in a facial image as a medium region. When the distribution of reliabilities of the group of the small regions in the upper face region satisfies the occlusion condition, the determination unit 21 may determine an occlusion pattern with sunglasses. For example, the determination unit 21 may set a lower face region including a group of small regions below the nose as a medium region. When the distribution of reliabilities of the group of small regions in the lower face region satisfies the occlusion condition, the determination unit 21 may determine an occlusion pattern with a mask. For example, the determination unit 21 may set a medium region according to possible various occlusion patterns.

Description below may be the advantage achieved by determining the occlusion pattern on a basis of the distribution of the reliabilities of the small regions or the distribution of the occluded regions. As to the reliability calculated for each small region, the result may be likely to become unstable depending on shooting conditions and the like. Therefore, if occlusion determination using the reliability is performed for each small region, there may be a high possibility that errors occur. The errors may mean a situation where small regions that are supposed to be occluded regions are determined to be not the occluded regions or a situation where small regions that are supposed to be not occluded regions are determined to be the occluded regions. The reliability that can cause such an error may be noise. If the regions other than the occluded regions are used for identification, on a basis of such occlusion determination for each small region, there may be a possibility that the small regions (occluded regions) which are originally not suitable for identification are considered not to be the occluded regions and used for identification. In other aspects, there may be a possibility that the small regions (regions that are not occluded regions) which are originally suitable for identification are considered to be the occluded regions and not used for identification. Therefore, the occlusion determination using the reliability for each small region may reduce the recognition accuracy.

In some aspects, typical face occlusion patterns that can often occur in daily life may include those with a mask and sunglasses. In such occlusion patterns, a very large area, i.e., about ⅓ to ½ of the face may be occluded. Considering characteristics of such occlusion patterns, if the reliability has no noise, it may be unlikely that few small regions having reliability lower (or higher) than the threshold exist in a group of small regions having reliability higher (or lower) than the threshold. Therefore, when a reliability obviously different from those of the surrounding small regions is calculated, the calculated reliability may be considered to be noise.

As described above, the determination unit 21 may estimate, considering such errors (noises), whether or not the medium region is the occluded region, on a basis of whether or not the distribution of the reliabilities in the medium region including the group of small regions within the predetermined range satisfies the occlusion condition. Thus, the determination unit 21 may accurately estimate the occluded region, compared with the case where it is determined whether or not the small region is the occluded region, using only the reliability for each small region. As a result, the determination unit 21 may accurately determine the occlusion pattern.

The identification unit 22 may perform identification for each small region other than excluded regions based on the occlusion pattern in the input facial image. The excluded regions are assumed to be predetermined according to the occlusion pattern, as in the case of the first example. For example, in the case of an occlusion pattern with a mask, regions in the lower half of the face may be set as the excluded regions. In the case of an occlusion pattern with sunglasses, regions in the upper half of the face may be set as the excluded regions. The excluded regions may not have to coincide with the occluded regions estimated through the occlusion pattern determination process by the determination unit 21.

The identification unit 22 may identify the facial image on a basis of the identification result for each small region other than the excluded regions. For example, the identification unit 22 may calculate an identification score for each small region other than the excluded regions based on the occlusion pattern in the facial image. In such a case, the identification unit 22 may calculate a combined score by combining the calculated identification scores of the respective small regions, and output the combined score as an identification result.

In some instances, the identification unit 22 may calculate the identification score by performing matching between the corresponding small regions among the small regions obtained by dividing the input facial image and the small regions included in the registered facial image. In this case, the identification unit 22 may compare the corresponding small regions in the regions which are not included in any of the excluded regions based on each of the occlusion patterns in the input facial image and in the registered facial image. The identification unit 22 may calculate the identification score for each small region other than the excluded regions, on a basis of the comparison result between the small regions. The identification unit 22 may calculate a combined score by combining the identification scores, and output the combined score as the identification result.

It is assumed that the registered facial image may be stored beforehand in the storage device 1004. The storage device 1004 may store, together with the registered facial image, information indicating an occlusion pattern of the registered facial image. The storage device 1004 may store, together with the registered facial image, information indicating small regions included in the registered facial image. The occlusion pattern of the registered facial image may be information determined by the determination unit 21 in registration of the registered facial image. The small regions included in the registered facial image may be information divided by the division unit 23 in registration of the registered facial image.

As the identification score between corresponding small regions, the identification unit 22 may use a value on a basis of a distance or correlation between feature vectors. In this case, the feature vector of each small region may be information obtained by feature extraction processing, such as a Gabor filter or an LBP, for example. In some aspects, the identification unit 22 may use, for identification processing with the registered facial image, a feature vector having higher discrimination ability than the feature vector used in calculation of the reliability with the standard facial image. For example, the identification unit 22 may learn a conversion matrix into a lower dimension by performing linear discriminant analysis on a feature vector extracted from training data. In some aspects, the training data may be a facial image correctly labeled for each person. Such training data may be a registered facial image. In a case where all users of the image recognition apparatus 2 can be identified (e.g., a case where the image recognition apparatus is used for access control), for example, the training data may be registered facial images of all system users. The training data may not be limited to the registered facial images, but may be other labeled facial images. For example, in a case where the image recognition apparatus 2 is used to authenticate many and unspecified people (e.g., a case where the image recognition apparatus is used to detect a suspicious person), the training data may be facial images of a number of labeled people, regardless of whether or not the people are system users. The identification unit 22 may generate a low-dimension feature vector with higher discrimination ability, by operating the conversion matrix described above for the feature vector of each of the small regions in the input facial image and the registered facial image.

Figure 9:
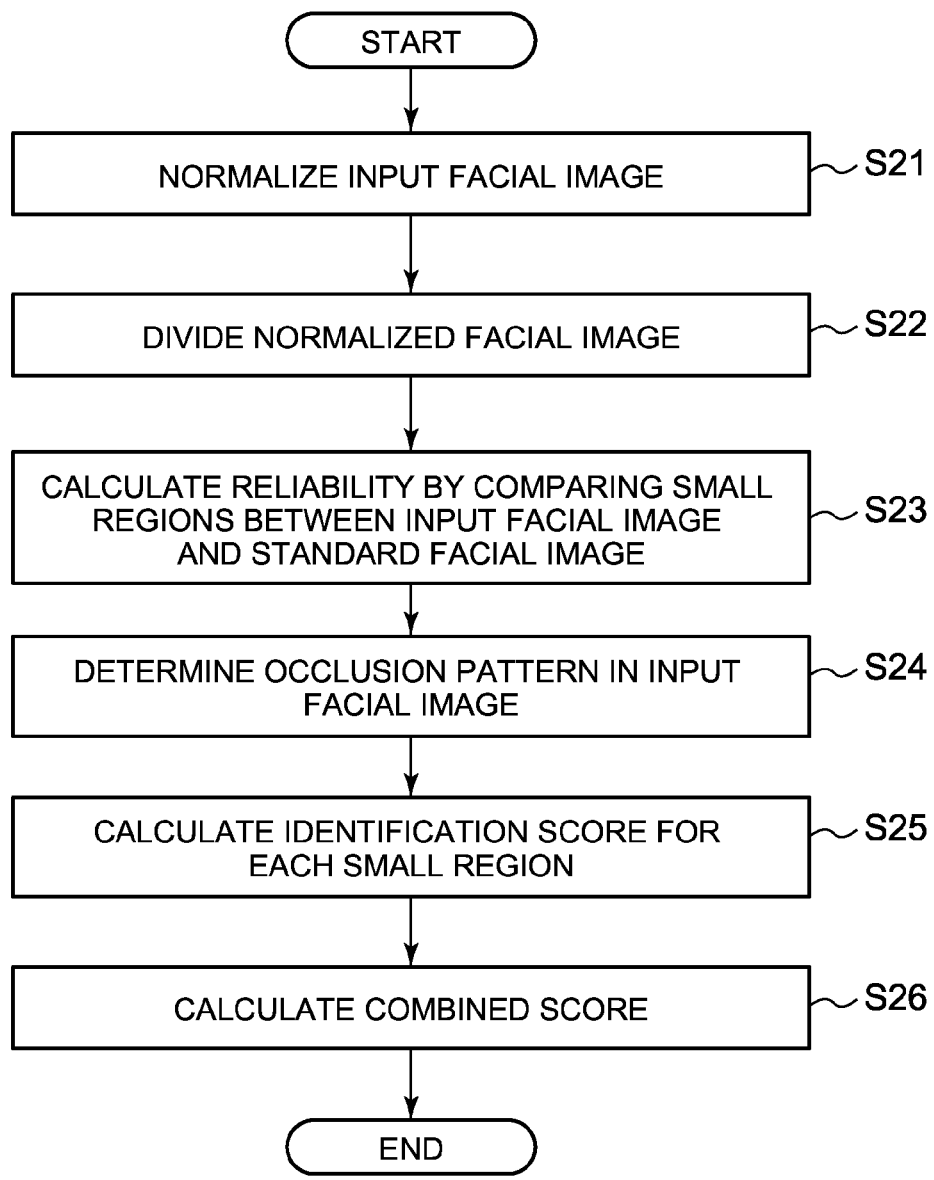
FIG. 9 is a flowchart depicting operations of the image recognition apparatus according to embodiments of the present disclosure.

With reference to FIG. 9, an example of operations of the above-described image recognition apparatus 2 will be described. It is assumed that the storage device 1004 store beforehand a standard facial image and a registered facial image. The standard facial image may be divided beforehand into small regions. It is assumed that the registered facial image is divided beforehand into small regions. It is assumed that the registered facial image is stored together with information indicating an occlusion pattern.

In the Step S21 in FIG. 9, the division unit 23 may normalize the input facial image.

In the Step S22, the division unit 23 may divide the input facial image normalized in the Step S21 into small regions.

In the Step S23, the reliability calculation unit 24 may compare corresponding small regions with each other among the small regions in the facial image divided in the Step S22 and the small regions in the standard facial image. The reliability calculation unit 24 may calculate the reliability of each of the small regions.

In the Step S24, the determination unit 21 may determine an occlusion pattern of the input facial image, on a basis of whether or not a distribution of a reliability of a group of small regions included in a medium region satisfies the occlusion condition.

In some instances, as described above, when the distribution of the reliability of the medium region representing the upper half or lower half of the face satisfies the occlusion condition, the determination unit 21 may estimate the medium region to be the occluded region. When the distribution of the reliability of the medium region representing the upper half or lower half of the face does not satisfy the occlusion condition, the determination unit 21 may estimate the medium region not to be the occluded region. When such a medium region is estimated to be the occluded region, the determination unit 21 may determine an occlusion pattern corresponding to the medium region. For example, when the upper half region is estimated to be the occluded region, the determination unit 21 may determine that the occlusion pattern is a pattern with sunglasses. When the lower half region is estimated to be the occluded region, the determination unit 21 may determine that the occlusion pattern is a pattern with a mask.

In the Step S25, the identification unit 22 may perform matching between the corresponding small regions among the small regions obtained by dividing the input facial image and the small regions included in the registered facial image. The identification unit 22 may calculate identification scores between the small regions.

As described above, the identification unit 22 may calculate the identification scores on a basis of a distance or correlation between feature vectors or low-dimension feature vectors.

In the Step S26, the identification unit 22 may calculate a combined score by combining the identification scores between the small regions calculated in the Step S25, while excluding a region based on the occlusion pattern determined in the Step S24.

When one of or both of the corresponding small regions between the input facial image and the registered facial image are included in the excluded regions based on the occlusion pattern of each image, the identification unit 22 may not use the identification scores between such small regions to calculate the combined score. When both of the corresponding small regions are not included in the excluded regions based on the occlusion pattern of each image, the identification unit 22 may use the identification scores between the small regions to calculate the combined score.

For example, the identification unit 22 may set an average value of the identification scores of the corresponding small regions, as the combined score. If no occlusion pattern is determined for both of the input facial image and the registered facial image, the identification unit 22 may set an average value of the identification scores of all the small regions, as the combined score. For example, when a mask occlusion pattern is determined in one of or both of the input facial image and the registered facial image, the identification unit 22 may set an average value of identification scores of the small regions in the upper half of the face, assuming that the lower half of the face is the excluded region, as the combined score. For example, the identification unit 22 may set a weighted average value as the combined score, by taking an average after multiplying the identification score of each of the target small regions by the reliability of each small region.

Then, the image recognition apparatus 2 may finish its operations.

An example of effects of the second example will be described.

The image recognition apparatus in some examples may improve the recognition accuracy of a facial image including an occluded region without increasing costs for constructing a system and identification processing load.

The reason for that may be because the division unit divides the facial image into the small regions, and the reliability calculation unit calculates the reliability of each small region by comparing corresponding small regions of the facial image and the standard facial image. The determination unit may estimate the occluded region in the facial image on a basis of the distribution of the reliability for each small region, and determine the occlusion pattern on a basis of the distribution of the occluded regions. The identification unit may perform identification for each small region while excluding the region set on a basis of the occlusion pattern in the facial image, and perform identification of the whole facial image on a basis of each identification result.

As described above, in this example, the occluded region may be estimated on a basis of the distribution of the reliability in a wider range, rather than determining whether or not each of the small regions included in the facial image is the occluded region, on a basis of the reliability thereof. As a result, this example may reduce the influence of errors in the occlusion determination for each small region, and may more accurately estimate the occluded region. In this example, the occlusion pattern may be determined on a basis of the distribution of the estimated occluded regions. Thus, the occlusion pattern may be determined more accurately while further reducing the influence of errors in the occlusion determination. In this example, the identification may be performed while excluding the region set according to the determined occlusion pattern, rather than excluding the regions estimated to be the occluded regions. Thus, this example may be more robust to occlusion determination errors. In this example, facial image identification may be performed on a basis of the identification result for each small region while excluding such region. Thus, this example may improve the recognition accuracy of the facial image while realizing robust occlusion detection against errors in determination of occluded regions.

In this example, the occluded regions and the occlusion pattern may be determined by comparison with one standard facial image. Thus, this example may not need a large amount of training data for determine the occluded regions and occlusion pattern in the existing technique. As a result, this example may significantly reduce the costs for system construction.

In this example, the registered image may be store beforehand in the storage device, together with the information on the occlusion pattern and divided small regions thereof. In some aspects, the present disclosure may not be limited thereto. In this example, the determination of the divided small regions and the occlusion pattern may be performed for the registered image during the identification of the input facial image.

Third Example

A third example will be described in detail with reference to the drawings. In the drawings to be referred to in the description of this example, the same configuration as that of the second example as well as the steps to be performed in the same manner as the second example are denoted by the same reference numerals.

Figure 10:
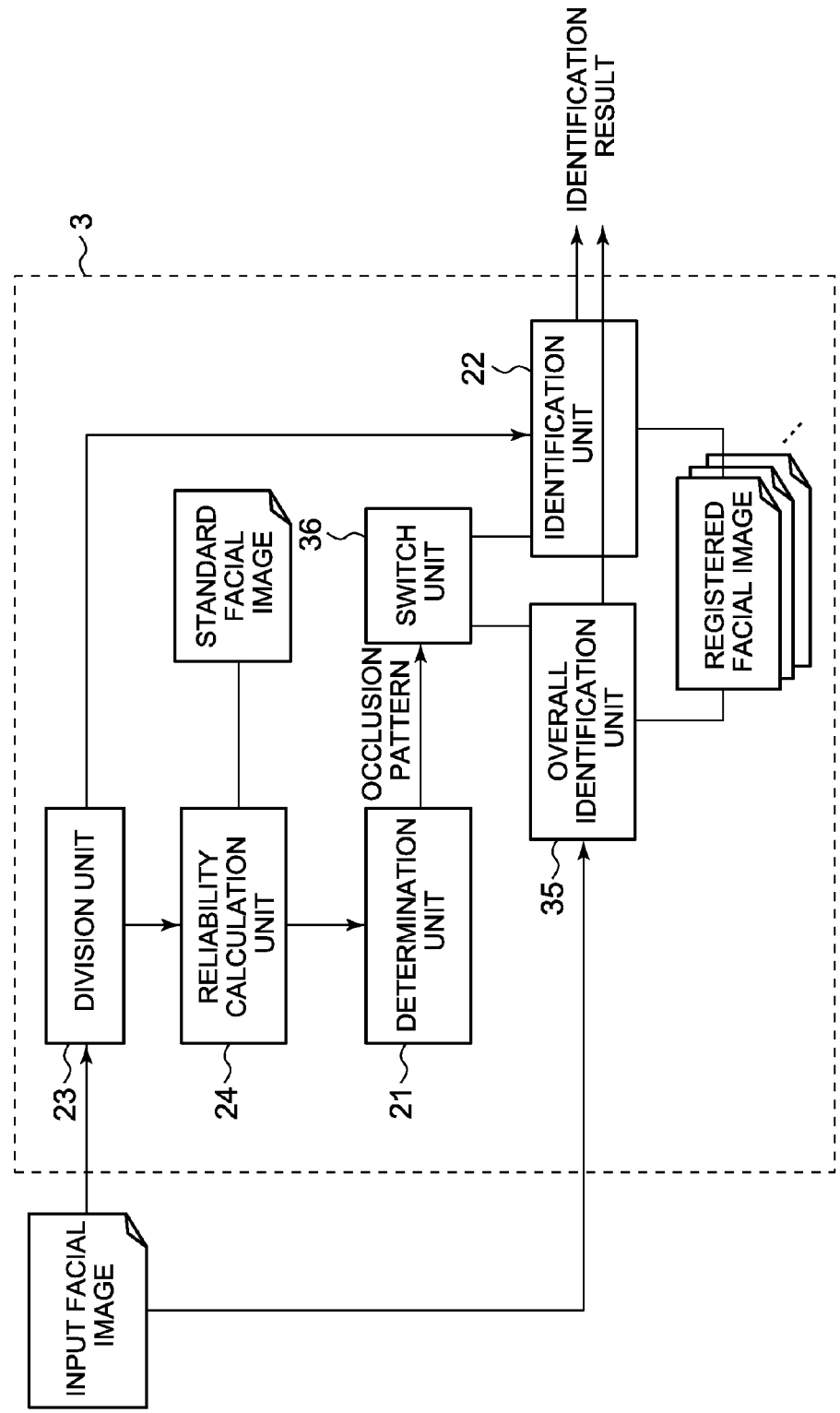
FIG. 10 is a block diagram of an image recognition apparatus according to embodiments of the present disclosure.

FIG. 10 shows a configuration of an image recognition apparatus 3 according to embodiments of the present disclosure. In FIG. 10, the image recognition apparatus 3 may include an overall identification unit 35 and a switch unit 36.

The image recognition apparatus 3 may include the same hardware components as those in the image recognition apparatus 1 as the first example described with reference to FIG. 2. In this case, the overall identification unit may include an output device 1006 and a CPU 1001 configured to read computer programs and various data stored in a ROM 1003 and a storage device 1004 into a RAM 1002 and execute the computer programs and data. The switch unit 36 may include the CPU 1001 configured to read the computer programs and various data stored in the ROM 1003 and the storage device 1004 into the RAM 1002 and execute the computer programs and data. The image recognition apparatus 3 and the hardware configuration of the respective functional blocks thereof may not be limited to those described above.

An example of configurations of the functional blocks of the image recognition apparatus 3 will be described.

The overall identification unit 35 may use information indicating the whole area of the face in a facial image to perform identification of the facial image. For example, the overall identification unit 35 may obtain a feature vector by extracting feature from the whole area of the face. The overall identification unit 35 may obtain a feature vector for the whole area of the face from a registered facial image. The overall identification unit 35 may calculate an overall identification score on a basis of the feature vector of the whole face area in the input facial image and the feature vector of the whole face area in the registered facial image. In some aspects, the overall identification unit 35 may output the overall identification score as the identification result.

The switch unit 36 may switch between the identification unit 22 and the overall identification unit 35 to perform identification of the input facial image, on a basis of the result of determination of the occlusion pattern by the determination unit 21.

Figure 11:
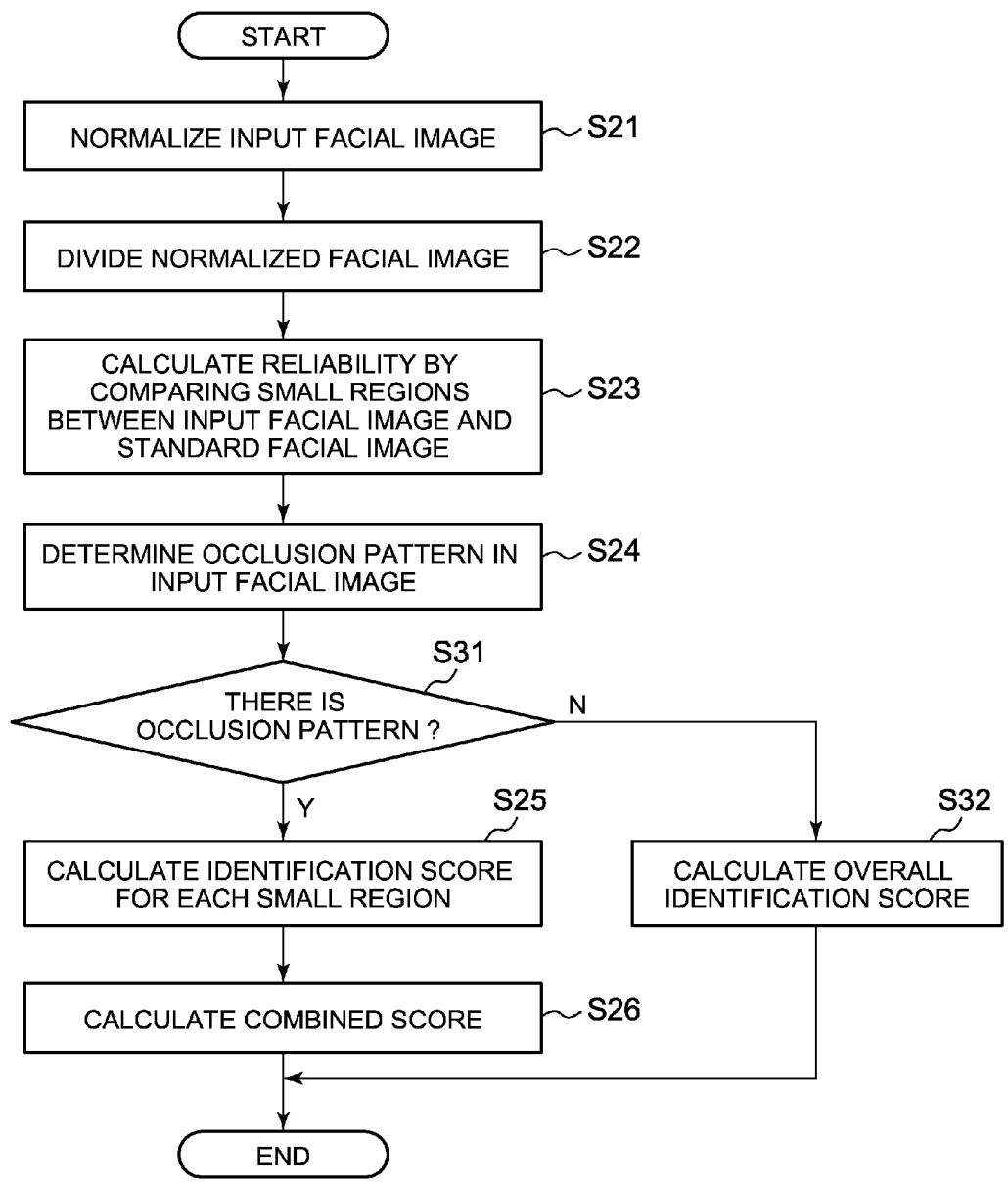
FIG. 11 is a flowchart depicting operations of the image recognition apparatus according to embodiments of the present disclosure.

With reference to FIG. 11, an example of operations of the above-described image recognition apparatus 3 will be described. In the following description, it is assumed that the registered facial image is stored in the storage device 1004, together with information indicating an occlusion pattern and small regions.

In FIG. 11, the image recognition apparatus 3 may determine an occlusion pattern in an input facial image by operating in the same manner as the image recognition apparatus 2 as the second example, in the Steps S21 to S24.

In the Step S31, the switch unit 36 may switch subsequent processing on a basis of the determined occlusion pattern. In some instances, the switch unit 36 may determine whether or not it is determined that there is an occlusion pattern, regardless of the type, in at least one of the input facial image and the registered facial image.

When it is determined that there is an occlusion pattern at least in either one thereof, the switch unit 36 may control the identification unit 22 to execute Steps S25 to S26 in the same manner as the second example.

When it is determined that there is no occlusion pattern in any of the input facial image and the registered facial image, the switch unit 36 may control the overall identification unit 35 to execute the following Step S32.

In the Step S32, the overall identification unit 35 may perform the identification using information on the whole area of the face in the input facial image and information on the whole area of the face in the registered facial image. In some instances, the overall identification unit 35 may calculate an overall identification score using a feature vector obtained from the whole face area in the input facial image and a feature vector obtained from the whole face area in the registered facial image.

For example, the overall identification unit 35 may obtain the feature vector from the whole face area in each image by feature extraction processing such as a Gabor filter or an LBP. The overall identification unit 35 may calculate the overall identification score from a distance or correlation between the feature vectors of the whole face areas in the input facial image and the registered facial image.

Then, the image recognition apparatus 3 may finish its operations.

An example of effects of the third example will be described.

The image recognition apparatus in some examples may prevent reduction in recognition accuracy of the facial image when there is no occluded region, in addition to the same effects achieved by the second example.

The reason for that may be because the switch unit switches the processing so as to perform identification using the information on the whole face area, without using the identification result for each small region, when there is no occlusion pattern in either the input facial image or the registered facial image. The switch unit may switch the processing so as to perform identification using the identification result for each small region, when there is an occlusion pattern in at least one of the input facial image and the registered facial image.

When there is no occlusion pattern and no regions need to be excluded, the identification result using the whole face area information may tend to achieve higher accuracy compared with combining the identification results of the respective small regions. Therefore, this example may not reduce the matching accuracy even when there is no occlusion pattern in either of the images while maintaining the high recognition accuracy when there is an occlusion pattern in at least one of the images.

In this example, the identification unit and the overall identification unit may calculate the identification score on a basis of the distance or correlation between the feature vectors. In some aspects, the identification unit may adopt other techniques to perform the identification.

Fourth Example

A fourth example will be described in detail with reference to the drawings. In the following figures, the reference numerals from the previous figures are reused to refer to repeated steps and elements.

Figure 12:
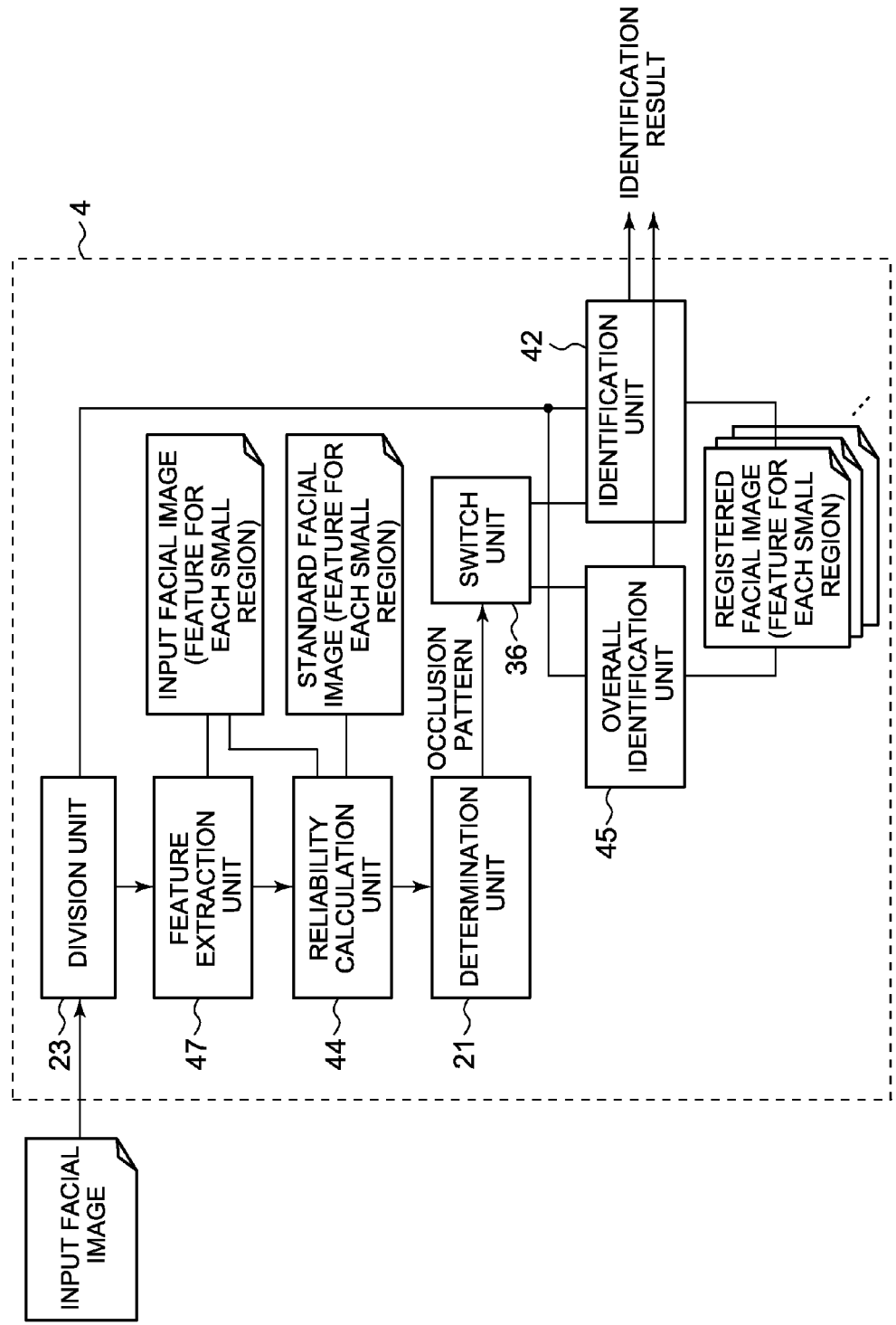
FIG. 12 is a block diagram of an image recognition apparatus according to embodiments of the present disclosure.

FIG. 12 shows a configuration of an image recognition apparatus 4 according to embodiments of the present disclosure. In FIG. 12, the image recognition apparatus 4 may include an identification unit 42, a reliability calculation unit 44, an overall identification unit 45, and a feature extraction unit 47.

The image recognition apparatus 4 may include the same hardware components as those in the image recognition apparatus 1 as the first example described with reference to FIG. 2. In some aspects, the feature extraction unit 47 may include a CPU 1001 configured to read computer programs and various data stored in a ROM 1003 and a storage device 1004 into a RAM 1002 and execute the computer programs and data. The image recognition apparatus 4 and the hardware configuration of the respective functional blocks thereof may not be limited to those described above.

The feature extraction unit 47 may extract a feature vector for each of small regions in a facial image divided by the division unit 23. The various filters and techniques described above may be used to extract the feature vector. For example, the feature extraction unit 47 may extract a Gabor feature value using a Gabor filter. In some instances, the feature extraction unit 47 may calculate the feature vector for each of the small regions normalized and divided by the division unit 23 for the input facial image, and store the calculated feature vectors in the storage device 1004. The feature extraction unit 47 may calculate beforehand the feature vectors for a standard facial image and a registered facial image. In this example, the standard facial image may be stored in the storage device 1004 as the feature vector for each small region, and data on the facial image itself may not be stored. The registered facial image may be stored in the storage device 1004 as the feature vector for each small region, and data on the registered facial image itself may not be stored.

The reliability calculation unit 44 may have approximately the same configuration as that of the reliability calculation unit 24 in the second and third examples. In some instances, the reliability calculation unit 44 may calculate the reliability using the feature vector for the corresponding small regions between the input facial image and the standard facial image. In some aspects, the reliability calculation unit 44 may be different from the reliability calculation unit 24 in obtaining the feature vector of each small region in the input facial image and the standard facial image from the storage device 1004.

The identification unit 42 may have approximately the same configuration as that of the identification unit 22 in the second and third examples. In some instances, the identification unit 42 may calculate identification scores using the feature vector for each of the corresponding small regions between the input facial image and the registered facial image. In some aspects, the identification unit 42 may be different from the identification unit 22 in obtaining the feature vector of each small region in the input facial image and the registered facial image from the storage device 1004. The identification unit 42 may learn beforehand a conversion matrix for converting a feature vector into a lower dimension, as in the case of the second and third examples. In such a case, the identification unit 42 may calculate the identification score using the one obtained by converting the feature vector for each small region into the lower dimension. For example, the identification unit 42 may calculate, as the identification score, a normalized correlation value between the low-dimension feature vectors of the corresponding small regions in the input facial image and the registered facial image. The identification unit 42 may calculate a combined score by combining the identification results for every small region after excluding any of the regions based on the occlusion patterns in the input facial image and the registered facial image.

The overall identification unit 45 may calculate an overall identification score on a basis of a concatenated feature vector of the input facial image and a concatenated feature vector of the registered facial image. The concatenated feature vector may be generated by connecting the feature vectors of the respective small regions. For example, for three small regions, feature vectors of Row n1 Column 1, Row n2 Column 1 and Row n3 Column 1 may be extracted, respectively. n1, n2 and n3 may be positive integers. These may be all the same value or at least some thereof may be different values from the others. In this case, the overall identification unit 45 may generate a concatenated feature vector of Row (n1+n2+n3) Column 1 by connecting the feature vectors. In some instances, the number of dimensions may be increased in the concatenated feature vector than in the feature vector of each small region. The order of connection may be arbitrary.

The overall identification unit 45 may learn beforehand a conversion matrix for converting the concatenated feature vector into a low-dimension concatenated feature vector by linear discriminant analysis on training data. In this case, the overall identification unit 45 may calculate a normalized correlation value between the low-dimension concatenated feature vectors, as the overall identification score.

Figure 13:
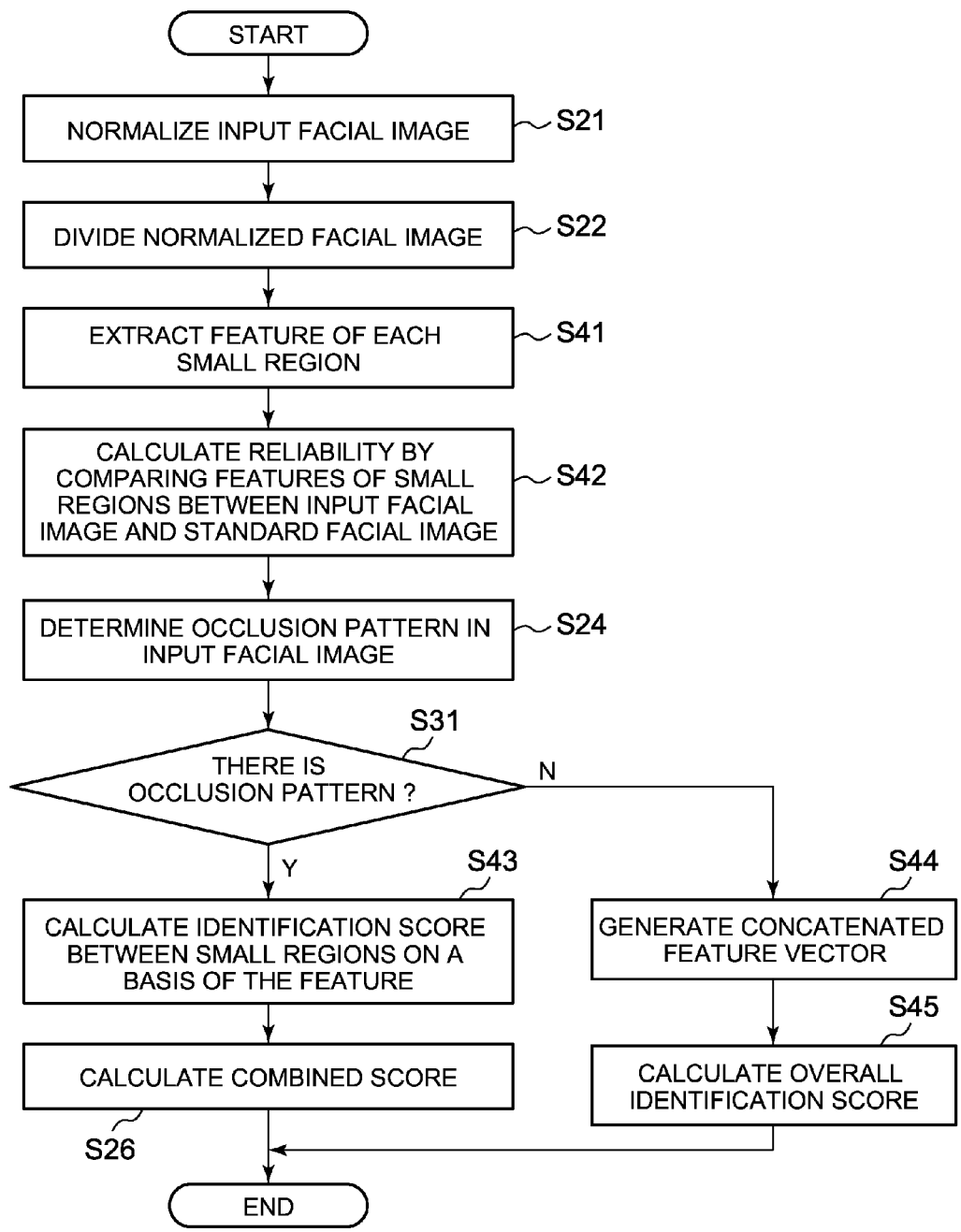
FIG. 13 is a flowchart depicting operations of the image recognition apparatus according to embodiments of the present disclosure.

With reference to FIG. 13, an example of operations of the above-described image recognition apparatus 4 will be described. In the following description, it is assumed that the feature vector of each of the small regions in the standard facial image is stored in the storage device 1004. The feature vector of each of the small regions in the registered facial image may be stored in the storage device 1004 together with the occlusion pattern previously determined by the determination unit 21.

In FIG. 13, the division unit 23 may normalize and divide the input facial image by executing Steps S21 to S22 in the same manner as the second example.

In the Step S41, the feature extraction unit 47 may extract a feature value for each small region in the input facial image, and store the extracted feature value in the storage device 1004.

In the Step S42, the reliability calculation unit 44 may calculate the reliability between the corresponding small regions for the feature vector of each small region in the input facial image stored in the storage device 1004 in the Step S41 and the feature vector of each small region in the standard facial image recorded in the storage device 1004.

The determination unit 21 may determine an occlusion pattern by executing Step S24 in the same manner as the second example.

When the switch unit 36 determines that there is an occlusion pattern in one of or both of the input facial image and the registered facial image, the identification unit 42 may execute Steps S43 and S26.

In the Step S43, the identification unit 42 may calculate the identification score between the corresponding small regions by using the feature vector of each small region stored in the storage device 1004 for the input facial image and the registered facial image.

For example, as described above, the identification unit 42 may calculate the normalized correlation value as the identification score between the low-dimension feature vectors obtained by converting the feature vectors of the corresponding small regions into the low dimension. The identification unit 42 may calculate a combined score by executing Step S26 in the same manner as the second example.

When the switch unit 36 determines that there is no occlusion pattern in either of the input facial image and the registered facial image, the overall identification unit 45 may execute Steps S44 to S45 as described below.

In the Step S44, the overall identification unit 45 may generate a concatenated feature vector by connecting the feature vectors of the small regions stored in the storage device 1004 for the input facial image and the registered facial image.

In the Step S45, the overall identification unit 45 may calculate an overall identification score by comparing the concatenated feature vectors for the input facial image and the registered facial image.

For example, as described above, the overall identification unit 45 may convert the concatenated feature vectors into the low dimension and then calculate a normalized correlation value between the low-dimension concatenated feature vectors, as the overall identification score.

Then, the image recognition apparatus 4 may finish its operations.

An example of effects of the fourth example will be described.

The image recognition apparatus in some examples may realize faster and more efficient processing while maintaining high recognition accuracy for facial image including an occluded region.

The reason for that may be because the feature extraction unit extracts and stores the feature vector for each of the small regions included in the input facial image, the standard facial image and the registered facial image. Thus, the reliability calculation unit, the identification unit and the overall identification unit may commonly use the already extracted feature vectors, thereby enabling faster and more efficient processing.

In the second to fourth examples described above, the identification unit and the overall identification unit may identify the input facial image by matching with the registered image. In some aspects, the present disclosure may not be limited thereto. The identification unit and the overall identification unit in each of the examples may perform gender estimation, pose estimation, facial expression recognition and the like of the person represented by the input facial image without using the registered image. Each of the examples may be applicable to the use involving various identification processing using no registered image for the facial image including an occluded region.

In the second to fourth examples described above, the determination unit, the identification unit and the overall identification unit may perform the occlusion pattern determination and the input facial image identification using the distance or correlation between the feature vectors. In some aspects, the present disclosure may not be limited thereto. The functional blocks in each of the examples may calculate the reliability or identification score by using another method to compare the regions. In such a case, the feature extraction unit according to the fourth example may calculate and store the information to be used for comparison of the small regions in the corresponding images.

In each of the examples described above, an example of the occlusion pattern may be the occlusion with a mask and sunglasses. In some aspects, the kind of the occlusion pattern may not be limited thereto.

In each of the examples described above, the input facial image, the standard facial image and the registered facial image may mean regions representing the face included in the corresponding images. Such facial images may be obtained by cutting out the face region beforehand or during processing.

In each of the examples described above, the functional blocks in the image recognition apparatus may be realized by the CPU configured to execute the computer programs stored in the storage device or the ROM. In some aspects, the present disclosure may not be limited thereto, but some of, all of or combinations of the functional blocks may be realized by dedicated hardware. Further, disclosed "units" may be implemented in hardware, software, or a combination of the two. For example, units may be application specific integrated circuits, processors, or field-programmable gate arrays. Units may be combined to operate on circuitry of the same processor, or may each be made up of multiple hardware elements.

In each of the examples described above, the functional blocks in the image recognition apparatus may be realized by being dispersed into more than one apparatus.

In each of the examples described above, the operations of the image recognition apparatus described with reference to the flowcharts may be stored in the storage device (storage medium) in the computer as the image recognition program. Such a computer program may be read and executed by the CPU. In such a case, the present disclosure may include a code or storage medium of the computer program.

The examples described above may be implemented in appropriate combination.

The present disclosure may not be limited to the examples described above, but can be carried out in various modes. Different embodiments may be combined without limitation, and the examples discussed herein are in no way mutually exclusive.

The invention claimed is:

1. An image recognition apparatus comprising:
   a memory storing instructions; and
   at least one processor configured to process the instructions to:
   determine an occlusion pattern of a face in a facial image representing the face by comparing the facial image with a standard facial image representing a standard face; and
   identify the facial image using a region determined by the occlusion pattern in the facial image;
   wherein the at least one processor determines the occlusion pattern further on a basis of:
      a distribution of a reliability on a basis of comparison of small regions included in the facial image with small regions in the standard facial image corresponding to the small regions in the facial image, and
      a medium region including a group of the small regions within a predetermined range, when a distribution of a reliability of the group of the small regions satisfies a predetermined occlusion condition.

2. The image recognition apparatus according to claim 1, wherein
   the medium region is an upper face region including a group of the small regions above a nose in the facial image.

3. The image recognition apparatus according to claim 2, wherein the at least one processor is further configured to process the instructions to:
   determine that the occlusion pattern is an occlusion pattern with sunglasses, when a distribution of a reliability in the upper face region satisfies the occlusion condition.

4. The image recognition apparatus according to claim 1, wherein
the medium region is a lower face region including a group of the small regions below a nose in the facial image.

5. The image recognition apparatus according to claim 4, wherein the at least one processor is further configured to process the instructions to:
determine that the occlusion pattern is an occlusion pattern with a mask, when a distribution of a reliability in the lower face region satisfies the occlusion condition.

6. The image recognition apparatus according to claim 1, wherein the at least one processor is further configured to process the instructions to:
divide the facial image into the small regions, and
calculate the reliability by comparing the corresponding small regions of the facial image and the standard facial image with each other.

7. The image recognition apparatus according to claim 1, wherein the at least one processor is further configured to process the instructions to:
identify for each of the small regions determined by the occlusion pattern in the facial image, and
identify the facial image on a basis of a result of identifying for each of the small regions.

8. The image recognition apparatus according to claim 1, wherein the at least one processor is further configured to process the instructions to:
identify the facial image by using information on an entire area of the face, and
determine whether to use a result of identifying the facial image by using information on the region determined by the occlusion pattern in the facial image or a result of identifying the facial image by using information on an entire area of the face.

9. The image recognition apparatus according to claim 1, wherein the at least one processor is further configured to process the instructions to:
the region determined by the occlusion pattern in the facial image is obtained by excluding a region based on the occlusion pattern in the facial image.

10. The image recognition apparatus according to claim 7, wherein the at least one processor is further configured to process the instructions to:
identify for each of the small regions other than a region based on the occlusion pattern in the facial image.

11. The image recognition apparatus according to claim 1, wherein
the standard facial image is obtained by averaging the facial images of a plurality of persons.

12. The image recognition apparatus according to claim 1, wherein
the standard facial image is an image whose similarity to facial images of a plurality of persons satisfies a predetermined condition.

13. The image recognition apparatus according to claim 1, wherein
the standard facial image is a facial image representing an artificial object of a standard face.

14. The image recognition apparatus according to claim 1, wherein
the facial image and the standard facial image include information indicated by feature vectors.

15. An image recognition method comprising:
determining an occlusion pattern of a face in a facial image representing the face by comparing the facial image with a standard facial image representing a standard face; and
identifying the facial image using a region determined by the occlusion pattern in the facial image,
wherein the occlusion pattern is determined further on a basis of:
a distribution of a reliability on a basis of comparison of small regions included in the facial image with small regions in the standard facial image corresponding to the small regions in the facial image, and
a medium region including a group of the small regions within a predetermined range, when a distribution of a reliability of the group of the small regions satisfies a predetermined occlusion condition.

16. A non-transitory computer-readable storage medium storing instructions that when executed by a computer enable the computer to implement a method comprising:
determining an occlusion pattern of a face in a facial image representing the face by comparing the facial image with a standard facial image representing a standard face; and
identifying the facial image using a region determined by the occlusion pattern in the facial image,
wherein the occlusion pattern is determined further on a basis of:
a distribution of a reliability on a basis of comparison of small regions included in the facial image with small regions in the standard facial image corresponding to the small regions in the facial image, and
a medium region including a group of the small regions within a predetermined range, when a distribution of a reliability of the group of the small regions satisfies a predetermined occlusion condition.

* * * * *